US012728742B2

(12) United States Patent
Dehm et al.

(10) Patent No.: US 12,728,742 B2
(45) Date of Patent: Sep. 8, 2026

(54) SUPPLEMENTARY CHARGING DEVICE FOR AN AC WALLBOX AS WELL AS AC-DC WALLBOX COMPRISING SUCH A SUPPLEMENTARY CHARGING DEVICE

(71) Applicants: AUDI AG, Ingolstadt (DE); HAGER ELECTRO GMBH & CO. KG, Blieskastel (DE)

(72) Inventors: Martin Dehm, Monheim (DE); Ulrich Reiner, Hochspeyer (DE)

(73) Assignees: AUDI AG, Ingolstadt (DE); HAGER ELECTRO GMBH & CO. KG, Blieskastel (DE)

( * ) Notice: Subject to any disclaimer, the term of this patent is extended or adjusted under 35 U.S.C. 154(b) by 691 days.

(21) Appl. No.: 18/142,053

(22) Filed: May 2, 2023

(65) Prior Publication Data

US 2023/0347761 A1 Nov. 2, 2023

(30) Foreign Application Priority Data

May 2, 2022 (DE) ......................... 102022110650.0

(51) Int. Cl.
*B60L 53/18* (2019.01)
*B60L 53/10* (2019.01)
(Continued)

(52) U.S. Cl.
CPC ............... *B60L 53/18* (2019.02); *B60L 53/11* (2019.02); *H02J 7/04* (2013.01); *B60L 55/00* (2019.02); *B60L 2210/30* (2013.01)

(58) Field of Classification Search
CPC .......... B60L 53/18; B60L 53/11; B60L 55/00; B60L 2210/30; B60L 53/14; B60L 53/50;
(Continued)

(56) References Cited

U.S. PATENT DOCUMENTS 8,687,396 B2 * 4/2014 Fratta ................ H02M 7/53871 363/137
9,090,169 B2 * 7/2015 Ang ........................ B60L 53/62
(Continued)

FOREIGN PATENT DOCUMENTS

DE 10 2014 223 585 A1 5/2016
DE 10 2015 207 413 A1 10/2016
(Continued)

OTHER PUBLICATIONS

M. Safayatullah, M. T. Elrais, S. Ghosh, R. Rezaii and I. Batarseh, "A Comprehensive Review of Power Converter Topologies and Control Methods for Electric Vehicle Fast Charging Applications," in IEEE Access, vol. 10, pp. 40753-40793 (Year: 2022).*
(Continued)

*Primary Examiner* — M Baye Diao
(74) *Attorney, Agent, or Firm* — STAAS & HALSEY LLP

(57) ABSTRACT

A supplementary charging device for an AC wallbox includes a housing, a first port for coupling to a charging port of a vehicle, the first port including an AC port and a DC port, a second port for coupling to an AC output of the AC wallbox via an AC charging cable, an at least unidirectionally formed DC/AC converter, and a control device arranged in the housing, the control device to couple the second port to the AC port of the first port, to couple the AC port of the at least unidirectionally formed DC/AC converter to the second port and to couple the DC port of the at least unidirectionally formed DC/AC converter to the DC port of the first port in a first operating mode, such that power coupled-in via the DC port of the DC/AC converter is provided at the second port.

20 Claims, 4 Drawing Sheets

(51) Int. Cl.
*B60L 55/00* (2019.01)
*H02J 7/04* (2006.01)

(58) Field of Classification Search
CPC ... B60L 53/10; B60L 53/16; H02J 7/04; H02J 7/06; H02J 2207/20; Y02T 10/70; Y02T 10/7072; Y02T 90/14
USPC .......................................................... 320/109
See application file for complete search history.

(56) References Cited

U.S. PATENT DOCUMENTS

| | | | | |
|---|---|---|---|---|
| 10,355,611 | B2 * | 7/2019 | Nagashima | B60L 53/11 |
| 10,471,838 | B2 * | 11/2019 | Rajaie | B60L 53/16 |
| 10,759,287 | B2 * | 9/2020 | Vahedi | B60L 53/11 |
| 11,322,968 | B2 * | 5/2022 | Ruppert | B60L 53/14 |
| 11,458,850 | B2 * | 10/2022 | Graßl | B60L 53/16 |
| 2016/0176305 | A1 | 6/2016 | James et al. | |
| 2018/0201142 | A1 | 7/2018 | Galin et al. | |
| 2020/0031238 | A1 | 1/2020 | Kydd | |
| 2020/0044480 | A1 | 2/2020 | Kydd | |
| 2020/0164755 | A1 * | 5/2020 | Smolenaers | B60L 53/53 |

FOREIGN PATENT DOCUMENTS

| | | | | |
|---|---|---|---|---|
| DE | 10 2017 100 138 | A1 | 7/2018 | |
| DE | 10 2019 211 553 | A1 | 2/2021 | |
| DE | 102020100008 | A1 * | 7/2021 | H02J 7/585 |
| JP | 2012-228034 | A | 11/2012 | |
| WO | WO 2014/199203 | A2 | 12/2014 | |

OTHER PUBLICATIONS

European Office Action dated Sep. 2, 2023 in the parallel European Application No. 23169403.5.

German Office Action dated Feb. 1, 2023 for German Application No. 10 2022 110 650.0.

* cited by examiner 22
60
48
54b
56b
46
56a
58b
54a
58a
42
40
44
92'
92
88'
PV
88
50'
52
38
AC
DC
HS
90'
90
76
74
36'
84
78
80
96
82
94
86
62
64
66
68
70
72

SUPPLEMENTARY CHARGING DEVICE FOR AN AC WALLBOX AS WELL AS AC-DC WALLBOX COMPRISING SUCH A SUPPLEMENTARY CHARGING DEVICE

CROSS REFERENCE TO RELATED APPLICATIONS

This application claims the priority benefit under 35 USC 119 of German Application No. 10 2022 110 650.0 filed on May 2, 2022, the entire contents of which are incorporated by reference herein.

BACKGROUND

Aspects of the present invention relate to a supplementary charging device for an AC wallbox as well as to an AC-DC wallbox including such a supplementary charging device.

Moreover, aspects of the present invention very generally relate to charging electric vehicles. In this context, FIG. 1 schematically shows the concept primarily used nowadays, which is referred to as AC charging, wherein, by means of an AC wallbox 10 and an AC charging cable 12, energy is transferred from a public grid connection 14 or a home connection 16, which is coupled to an input 18 of the AC wallbox 10, to a charging port 20 of a motor vehicle 22. In order to store the AC power provided at the charging port 20 in a vehicle battery, an on-board charger arranged in the motor vehicle 22 is provided, which includes an AC-DC converter, the rated charging power of which is usually 11 kW or 22 kW. Correspondingly, a rated power of 11 kW or 22 kW is provided at the output 24 of the AC wallbox 10. In known manner, the AC wallbox 10 in particular includes a control or protection device, but which is not illustrated in FIG. 1 for the sake of clarity. At the rated power, the efficiency $\eta$AC of the AC wallbox is usually considerably above 97%, that of an on-board charger is between 93 and 96%.

A further concept known from the related art is the so-called DC charging. As illustrated in FIG. 2 in this context, a DC wallbox 26 includes an AC/DC converter, which is also designed for a rated charging power. With unidirectional design of the AC/DC converter (not illustrated), the rated power is between 50 kW and 350 kW in the so-called fast charging, which is for example provided at highways. In the semi-public traffic area, there are first available products with rated charging powers of 11 kW and 22 kW.

According to FIG. 2, a DC charging port 28, which is coupled to the output 32 of the DC wallbox 26 via a DC charging cable 30, is provided at the vehicle 22 for charging the vehicle 22. The input of the DC wallbox 26 is denoted by 34 and coupled to a public grid connection 14 or a home connection 16. As is further illustrated in FIG. 2, the DC wallbox 26 can be designed for bidirectional charging, this means that the vehicle 22 can serve as a mobile storage for example to feed energy buffered in a vehicle battery of the vehicle 22 again back into the home grid or an electrical grid. This approach is in particular considered for buffering energy from a photovoltaic system. The efficiency of the bidirectionally operating AC-DC converter is denoted by $\eta$DC and is usually 93 to 96% in the charging operation at rated power.

Furthermore, a charging station is known from the related art, which is sold by the company FORD under the designation "Ford Charge Station Pro". It allows bidirectional charging to use a battery storage of a vehicle as a current generating source in case of power blackouts. The rated power is 19.2 kW in the AC charging operation, that is in charging the battery storage of the vehicle from an AC source. In the discharging operation, a power of up to 9.6 kW can be drained from the vehicle battery. For feeding the drained DC power into a home grid, the charging station is to be coupled to an inverter of a photovoltaic system (PV) with galvanic separation. The rated power of PV inverters is usually in the order of magnitude from 8 to 12 kW.

From DE 10 2018 113 174 A1, a charger for energy exchange between a supply grid at a charging station and a battery of an electric vehicle is known, wherein the charger comprises a supply grid connection and a battery port, wherein a first matrix converter is provided at its supply grid connection and a second matrix converter is provided at its battery port. The charger comprises an N-phase high-frequency transformer between the two matrix converters, wherein the matrix converters each include a number of N by N bidirectional power semiconductor switches. The charger comprises a control unit, which is configured to switch the bidirectional power semiconductor switches according to predetermined requirements to a supply current and grid stabilizing current, respectively, and charging current and discharging current, respectively, with a selection from a plurality of programmable control methods, wherein the charger can be selectively arranged at the charging station or at the electric vehicle.

SUMMARY

An aspect of the present invention is in providing an improved, resource-conserving charging and discharging concept. It is to be implemented as inexpensively as possible.

Aspects of the present invention are based on the realization that the substantial disadvantage of the concept presented in FIG. 2 is in that the AC/DC converter therein used for charging is designed for a rated power in the charging operation and therefore efficiencies $\eta$ of 90 and more percent only arise in charging a vehicle. While the rated power in the charging operation is 11 kW or 22 kW, the discharging operation, for example in using the battery storage of the vehicle as a mobile home storage, occurs depending on the home power consumption. The basic consumption of many modern homes is at circa 100 to 300 watts. Since the efficiency $\eta$ extends hyperbolically across the quotient of the actual power P and the rated power Pnom, only very low efficiencies can be achieved in the discharging operation with the measures known from the related art. For example, if a DC wallbox according to FIG. 2 is dimensioned to a rated power of 11 kW in the charging operation, the efficiency in the discharging operation at a discharging power of 0.5 kW is only 65 percent. If the DC wallbox is used to charge a vehicle storage with power of a photovoltaic system not needed in a home, the efficiency is also low in the charging operation according to solar radiation, since the rated power, in particular with usual 10 kW peak design, is far from being achieved.

The disadvantage of the Ford Charge Station Pro is in that a photovoltaic system has to be present to use the inverter thereof, in particular one with galvanic separation, for converting DC power to AC power. It is then supplemented by an AC wallbox to be able to charge a vehicle from an AC source. Thereby, the design of the DC/AC conversion is preset, which is accordingly determined by the power of the solar collectors of the photovoltaic system. Moreover, inverters without galvanic separation cannot be used. A degree of freedom for optimizing a DC discharge from a vehicle storage into an AC supply grid, for example with regard to an average home consumption, is not present. In the Ford Charge Station Pro, this disadvantage is acceptable since an employment is only intended as an emergency power supply, but not a regular, resource-conserving operation as the invention has set itself as a target.

Therefore, the present disclosure provides two antiparallel current paths in its simplest configuration, namely a charging path and a discharging path, which can be differently dimensioned with respect to the rated power essential in the respective path and thereby in terms of power. Thereby, an optimum efficiency can be realized both in the charging operation and in the discharging operation. Due to the design of the DC discharging path to a lower rated power, the components required thereto are more inexpensive and the required installation space is smaller. It is advantageously noticeable that the power dissipation is low due to the high efficiency and therefore cooling measures like fans, cooling liquid or cooling elements can be omitted.

This concept can be inexpensively implemented by a supplementary charging device according to the invention for an AC wallbox, which can be applied as a supplement of an already present, that is installed, AC wallbox. Such a supplementary charging device according to an example of the invention for an AC wallbox includes a housing, a control device arranged in the housing, a first port for coupling to a charging port of a vehicle, wherein the first port includes an AC port and a DC port, a second port for coupling to an AC output of the wallbox via an AC charging cable, wherein the control device is adapted to couple the second port to the AC port of the first port, as well as an at least unidirectionally formed DC/AC converter, wherein the control device is adapted to couple the AC port thereof to the second port and to couple the DC port thereof to the DC port of the first port in a first operating mode such that power coupled-in via the DC port of the DC/AC converter can be provided at the second port.

An example of the present invention allows retrofitting present AC wallboxes to use a battery storage of a vehicle as a buffer with provision of a high efficiency both in charging and in discharging—and thereby in environment- and resource-conserving manner.

The AC port of the first port may include all of the three phases L1, L2, L3, a neutral conductor N, a protective conductor PE, a signal contact CP (Control Pilot) and a proximity contact PRX (Proximity Pilot). The DC port of the first port includes a conductor for DC+ and one for DC− and also uses the ports PE, CP and PRX.

The first operating mode primarily serves for DC discharge of a battery storage of a vehicle.

For example, the control device is formed to provide power coupled-in at the second port at the AC port of the first port in a second operating mode. Accordingly, this operating mode serves for the conventional AC charging of a battery storage of a vehicle.

By a unidirectional formation of the DC/AC converter, it can be inexpensively realized and still allows the execution of the first and the second operating mode.

Also for example, the supplementary charging device is configured for charging a storage device coupled to the AC port of the first port, in particular in the second operating mode, to a first rated power, wherein the supplementary charging device is further configured for discharging a storage device coupled to the DC port of the first port, in particular in the first operating mode, to a second rated power, wherein the first rated power is greater than the second rated power, wherein the first rated power is in particular between 11 and 22 kW, and the second rated power is in particular between 200 W and 5 kW. The second rated power may be within a rated power range with a lower rated power range threshold between 200 W and 500 W and an upper rated power range threshold between 2 kW and 5 kW. The second rated power is in particular selected for an operating range between 200 W and 5 kW, even more for an operating range between 200 W and 2 kW, such that the amount of the second rated power relevant to the dimensioning is within the specified operating ranges.

Therefore, the difference between the two rated powers in the charging and discharging operation is more than the factor of 2. As is apparent, the two paths extending antiparallel are accordingly designed for considerably different rated powers, wherein the term "design" means that a dimensioning of the electronic components required for the implementation to this rated power is effected. Thereby, both in the first operating mode and in the second operating mode, an efficiency of above 85 percent, readily even of more than 90%, can be achieved. If the discharging path would be dimensioned to the same rated power as the charging path, thus, the discharging path would only allow an efficiency of less than 65 percent. By separating charging and discharging path and the dimensioning to the respective rated power, thus, an efficiency difference of at least 20 percent can be realized in discharging. If the discharging path is operated with a power in discharging, which is considerably below the above mentioned rated power, for example 300 watts, thus, a sufficient efficiency for a reasonable operation can still be achieved with the proposed dimensioning, whereas with identical dimensioning of charging and discharging path, a reasonable employment is no longer possible with such powers due to the then very low efficiency in the discharging operation in the order of magnitude of less than 20 percent.

For example, the first port is formed to be coupled to the charging plug of an AC-DC cable in a single plug-in operation. In other words, despite of provision of a first port with contacts for AC and DC transfer, only a single plug-in operation is required to contact both the AC contacts of the AC port and the DC contacts of the DC port to a plug or a socket of the AC-DC charging cable. The same operation occurs a second time, namely for coupling the AC-DC charging cable to a charging port of a vehicle, also in a single plug-in operation. Alternatively, it can be provided that the supplementary charging device already includes an AC-DC charging cable, wherein the AC-DC charging cable comprises a port as the first port, which is formed to be coupled to a charging port of a vehicle in a single plug-in operation.

As already mentioned, the DC-AC converter can be formed only unidirectionally operable. For further operating modes, however, it is advantageous if it is formed bidirectionally operable.

While in a unidirectional design of the DC-AC converter, power can only be transferred to a battery storage of a vehicle via the AC path, wherein a so-called on-board charger of the vehicle is applied for rectification, which includes a correspondingly designed AC-DC converter, a bidirectional design of the DC-AC converter allows charging the vehicle storage using the DC-AC converter of the supplementary charging device according to an example of the invention as an AC-DC converter. Since in the operation of an on-board charger, various devices of the vehicle involved in the charging operation have to be put into operation, for example cooling, communication devices, control and monitoring devices, a rectification on the part of the supplementary charging device allows avoiding the operation of these required devices in the vehicle. Instead, corresponding devices are operated at a location, namely outside of the vehicle by supply from a grid or home connection, at which power can be substantially simpler provided and is available in unlimited manner—compared to a supply from a vehicle storage. Since less energy is required from the vehicle storage for operating the charging operation, the time duration required for a charging operation can be considerably shortened. Furthermore, it is to be taken into account that with high efficiency of the charging operation with corresponding design of the DC-AC converter, even no cooling demand at all arises in the vehicle, such that the charging of very small currents also becomes economically reasonable. As mentioned, such small currents are for example provided by photovoltaic systems, in particular in the partial load range.

In an example, the supplementary charging device further comprises a third port, which is formed as a DC port, wherein the control device is formed to provide DC power incoming via the third port at the DC port of the first port in a third operating mode (charging of vehicle storage via DC from photovoltaic system) and/or at a fourth port of the supplementary charging device as DC power in a fourth operating mode (charging of home battery storage via DC from photovoltaic system), wherein the fourth port is formed for coupling to a home battery storage. Additionally or alternatively, in a fifth operating mode (feeding power of photovoltaic system as AC into a home grid), the control device can be formed to couple the third port to the DC port of the DC-AC converter, wherein the AC port of the DC-AC converter is coupled to a fifth port of the discharging device, which can be coupled to a feed-in point of a home grid. Additionally or alternatively, the control device can be formed to couple the third port to the DC port of the DC-AC converter in a sixth operating mode (feeding power of photovoltaic system as AC into vehicle storage via on-board charger), wherein the AC port of the DC-AC converter is coupled to the AC port of the first port.

In this manner, the DC-AC converter of the supplementary charging device can be operated as an inverter of a photovoltaic system. In particular for smaller dimensioned photovoltaic systems, for example if sufficient roof surface in a preferred orientation is not available, the cost for realizing a photovoltaic system can be considerably reduced thereby. Furthermore, with bidirectional design of the DC-AC converter of the supplementary charging device, a particularly fast charging with simultaneous utilization of the AC path and the DC path, that is simultaneous AC and DC charging, is allowed.

In a seventh operating mode (providing AC from home connection as DC into the vehicle), the control device can be formed to couple the AC port of the DC/AC converter to the second port and to couple the DC port thereof to the DC port of the first port, such that power coupled-in via the second port can be provided at the DC port of the first port.

According to a further example, the supplementary charging device is formed mobile such that it can for example be carried in a vehicle and be employed as needed.

In particular, the discharging path only comprises a single-stage DC/AC converter.

In a further advantageous example, an average electrical basic consumption of a home is ascertained, to the home connection of which the supplementary charging device is coupled in discharging, wherein the second rated power is set depending on this average basic consumption. Therein, the second rated power can exactly correspond to the average electrical basic consumption, but also—for providing reserves—selected greater by a certain factor. For example, this factor can be between 1.1 and 2.

Furthermore, aspects of the present invention relate to an AC-DC wallbox including a supplementary charging device according to the invention, wherein the housing of the AC-DC wallbox represents the housing of the supplementary charging device, wherein the AC-DC wallbox includes a port for coupling to a home grid or an electrical grid, wherein the AC-DC wallbox includes a control and protection device, which is coupled to the port for coupling to a home grid or electrical grid on the input side and which is coupled to the second port of the supplementary charging device on the output side, wherein at least the first port of the supplementary charging device is formed as a port of the AC-DC wallbox.

While known wallboxes are formed either as AC or as DC wallboxes, an AC-DC wallbox, that is a hybrid wallbox, can be provided according to the invention. While the supplementary charging device according to an example of the invention is intended as a supplement to existing, that is already installed, AC wallboxes, an AC-DC wallbox according to an example of the invention may be provided in a new installation, that is in case that a wallbox has not yet been installed.

In this context, the control device is formed to couple the AC port of the DC-AC converter to the port for coupling to a home grid or electrical grid of the AC-DC wallbox in the fifth operating mode. Further, the third and/or the fourth and/or the fifth port of the supplementary charging device are formed as corresponding ports of the AC-DC wallbox. Thereby, the possibility of implementing the above mentioned further operating modes also at an AC-DC wallbox according to an aspect of the invention, if required, is provided.

Developments of the AC-DC wallbox, which comprise features, as they have already been described in context of the developments of the supplementary charging device according to the invention, also belong to the invention. For this reason, the corresponding developments of the AC-DC wallbox according to an aspect of the invention are not again described here.

Aspects of the invention also include the combinations of the features of the described embodiments. Thus, aspects of the invention also include realizations, which each comprise a combination of the features of multiple of the described embodiments if the embodiments have not been described as mutually exclusive.

BRIEF DESCRIPTION OF THE DRAWINGS

These and other aspects and advantages will become more apparent and more readily appreciated from the following description of the exemplary embodiments, taken in conjunction with the accompanying drawings of which.

DETAILED DESCRIPTION

Figure 1:
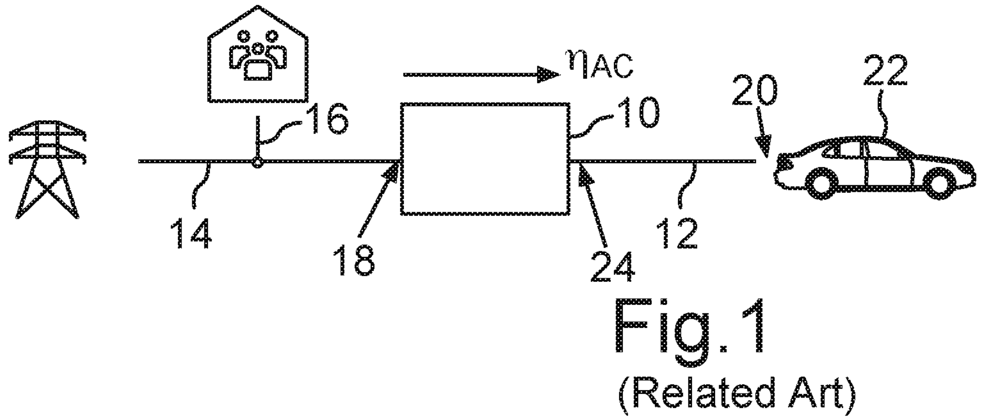
FIG. 1 is a schematic representation of conventional AC charging known from the related art.

Reference will now be made in detail to the preferred embodiments, examples of which are illustrated in the accompanying drawings, wherein like reference numerals refer to like elements throughout.

The embodiments explained in the following are example embodiments of the invention. In the embodiments, the described components of the embodiments each represent individual features of the invention to be considered independently of each other, which also each develop the invention independently of each other. Therefore, the disclosure also is to include combinations of the features of the embodiments different from the illustrated ones. Furthermore, the described embodiments can also be supplemented by further ones of the already described features of the invention.

In the figures, identical reference characters each denote functionally identical elements.

Figure 3:
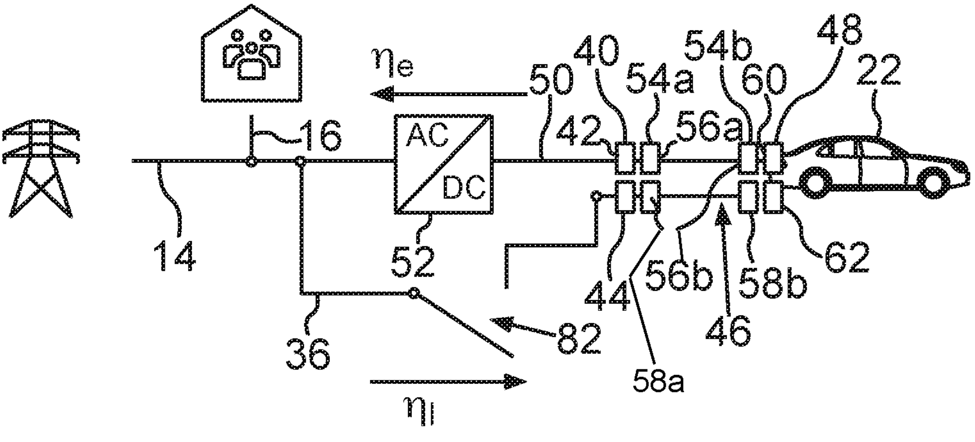
FIG. 3 is a schematic representation for explanation of the concept of a supplementary charging device according to an example of the invention.

FIG. 3 shows a schematic representation for explaining the concept, which is underlying a supplementary charging device according to an example of the invention. Accordingly, a grid connection 14 and/or a home connection 16 can be coupled via an AC path 36, which includes an AC wallbox 82, which is here represented as a switch in very simplified manner, for providing AC power via a charging port 40, which includes a DC port 42 and an AC port 44, using an AC-DC charging cable 46 to a charging port 60 of a vehicle 22, which includes a DC port 48 and an AC port 62. The AC-DC charging cable 46 comprises ports 54*a*, 54*b* at its ends, which each include a DC port 56*a*, 56*b* as well as an AC port 58*a*, 58*b*. Furthermore, the concept includes a DC path 50, which includes a DC-AC converter 52. The DC port of the DC-AC converter 52 is coupled to the DC port 42 of the charging port 40, while the AC port of the AC-DC converter 52 is coupled to the home connection 16 or the grid connection 14.

According to an example of the invention, the AC path 36 is dimensioned with regard to a rated power different from the DC path 50. As is apparent from the representation of FIG. 3, the AC path 36 is provided for charging a battery storage of the vehicle 22, while the DC path 50 serves for discharging the battery storage of the vehicle 22 to then feed this power as AC power via the home connection 16 into a home grid or via the grid connection 14 into a supply grid.

The rated power Pnom1 of the charging path 36 is in particular between 11 and 22 kW, while the rated power Pnom2 of the discharging path 50 is between 200 W and 5 kW. The efficiency in the charging path is denoted by ηl, while the efficiency in the discharging path is denoted by ηe. According to an example of the invention, by a dimensioning of the respective path to the rated power Pnom1, Pnom2 to be processed therein, it is allowed that both efficiencies ηl and ηe are above 85 percent, and even above 90 percent. Herein, dimensioning means that the components required for processing the corresponding rated power Pnom1, Pnom2, in particular switching transistors, are selected with regard to the respective rated power Pnom1, Pnom2.

In order to put the AC wallbox 82 into operation, in other words, "to stimulate" it, the supplementary charging device according to the invention has to "feel" like a vehicle 22 for the AC wallbox 82. For this reason, the supplementary charging device is adapted, in particular with respect to the communication with the AC wallbox 82, to execute at least one of the three following charging standards:

- IEC 61851-1 (CP and PRX communication), so-called basic communication;
- ISO15118 (PLC communication for AC and DC charging), so-called high-level communication, which only relates to comfort services for AC charging, but which is required for DC charging;
- DIN Spec 70121 DC charging, the former communication standard for DC charging.

Figure 5:
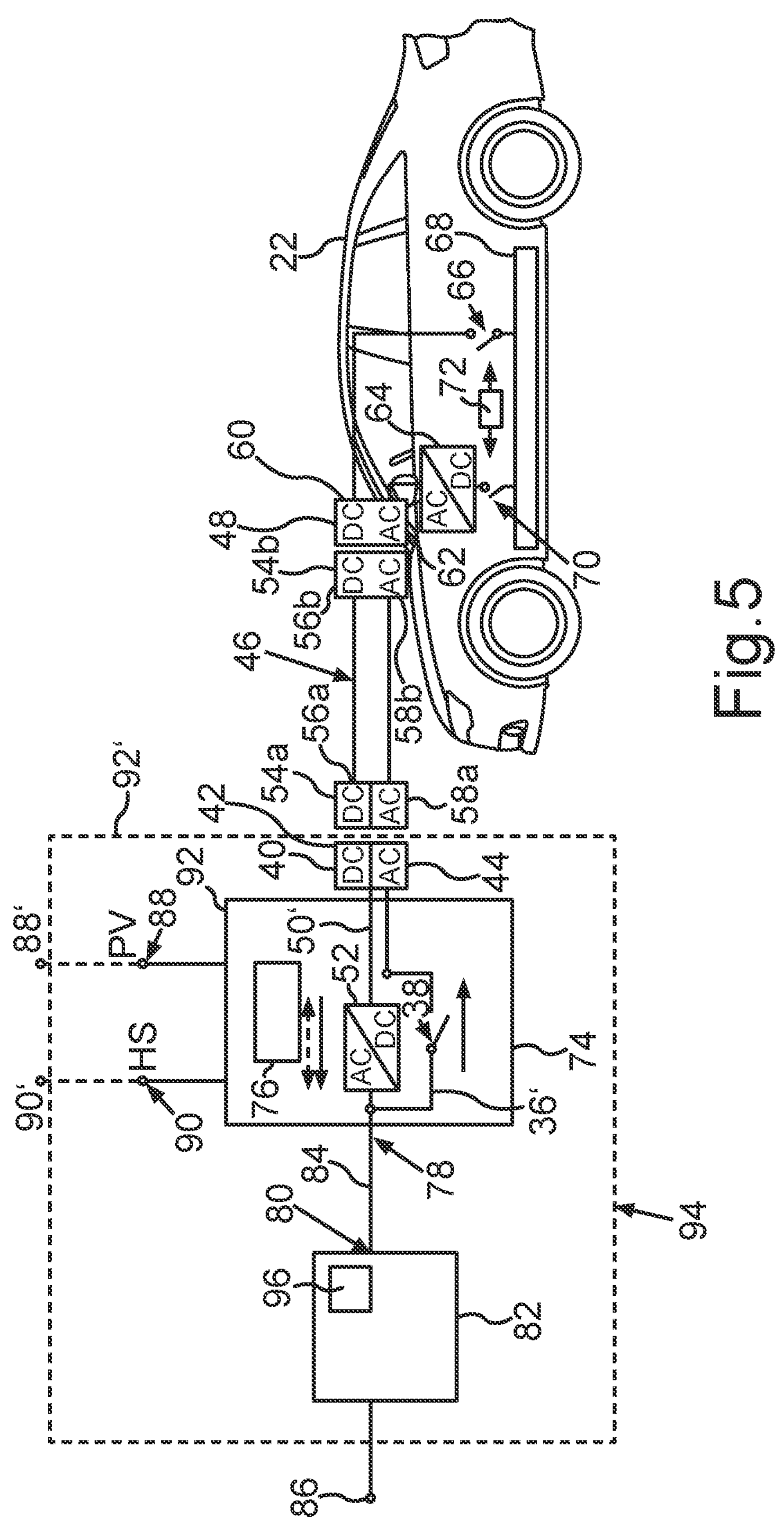
FIG. 5 is a schematic representation of an example of a supplementary charging device according to the invention as well as an example of an AC-DC wallbox according to the invention.

FIG. 3 shows the charging and discharging path in parallel arrangement for better clarification of the parallelism. However, a serial arrangement of AC wallbox and supplementary charging device, as it will be explained below in context of FIG. 5, is actually more practicable. The parallelism of the two paths is then ensured by suitable switching measures.

Figure 2:
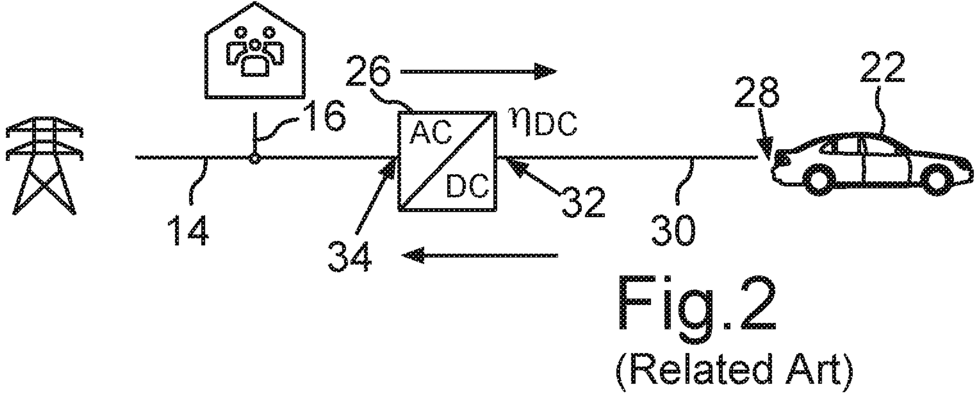
FIG. 2 is a schematic representation to the concept of DC charging and DC discharging known from the related art.
Figure 4:
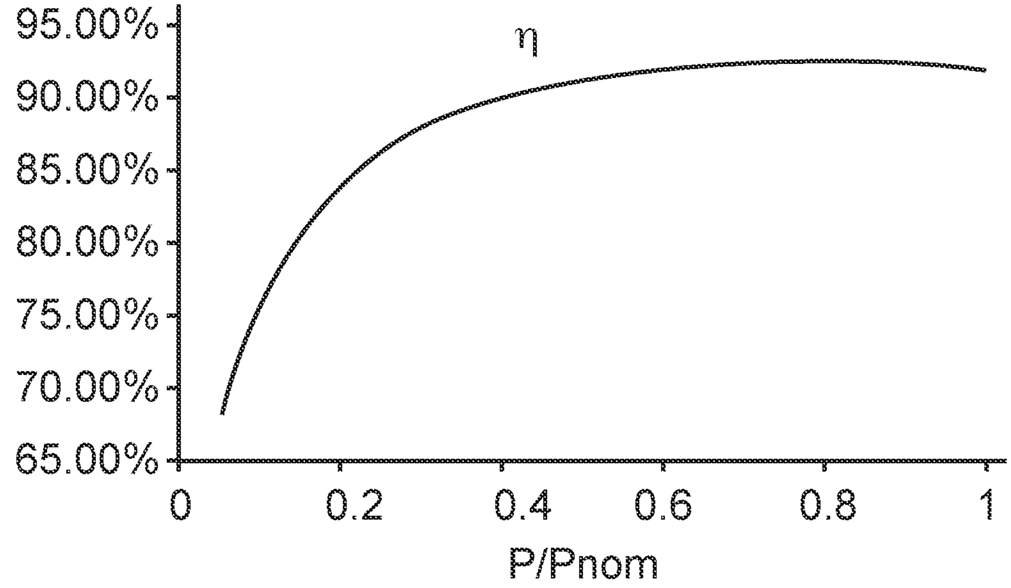
FIG. 4 shows an example of the course of the efficiency across the quotient of power P to the rated power Pnom.

FIG. 4 schematically shows the course of the efficiency η depending on the ratio of actually implemented power P to the rated power Pnom. As can be taken from the representation, the efficiency is more than 90 percent from a ratio P/Pnom equal to 0.4. For ratios P/Pnom below, the efficiency η rapidly drops, wherein it is about 85 percent for P/Pnom equal to 0.2, only 75 percent for P/Pnom equal to 0.1. A considerable efficiency deterioration in case of partial load operation results from it: If the AC-DC converter of FIG. 2 is bidirectionally designed and necessarily designed for processing a charging power of 11 kW, an efficiency of about 90 percent can be achieved hereby in charging the vehicle 22. In discharging with a discharging power of 0.5 kW, however, the efficiency decreases to 65 percent. Accordingly, high losses arise at a discharging power of 0.5 kW or below with an AC-DC converter, which is optimized to a high efficiency in charging with rated power of 11 kW.

If the charging path 36 is designed to rated power Pnom1 of 11 kW and the discharging path 50 is designed to rated power Pnom2 of 2 kW in the concept according to FIG. 3, thus, an efficiency ηe of more than 85 percent can be realized in discharging with a power of 0.5 kW. Compared to the concept of FIG. 2, thus, an efficiency improvement of 20 percent can be achieved by providing two differently designed antiparallel paths 36, 50.

The representation of FIG. 5 for further explanation of the concept according to an example of the invention reveals an on-board charger 64, of which a component, an AC/DC converter, is illustrated, the input of which is coupled to the AC port 62 of the charging port 48 and the output of which can be connected to a battery storage 68 of the vehicle 22 via a switch 70. The DC port 60 of the vehicle-side charging port 48 can be coupled to the battery storage 68 via a switch 66. A control device for operating the switches 70 and 66 is denoted by 72.

A supplementary charging device according to an example of the invention is denoted by 74 and includes the components presented in context of FIG. 3. It comprises a housing 92, in which the control device 76 as well as a part 36' of the AC path 36 and a part 50' of the DC path 50 are arranged. By an arrow drawn dashed, it is expressed that the DC-AC converter 52 can also be bidirectionally formed. The supplementary charging device 74 includes a control device 76, which can control switches and ports of the supplementary charging device 74, as will be illustrated in more detail below. The supplementary charging device 74 comprises a port 78 for coupling to an AC output 80 of an AC wallbox 82 via an AC charging cable 84. The AC wallbox 82 in turn comprises a port 86 to an AC voltage supply, for example a home grid or a supply grid. The supplementary charging device 74 comprises a DC port 88 for connecting a photovoltaic system as well as a DC port 90 for connecting a home battery storage.

The control device 76 is adapted to couple the AC port of the AC-DC converter 52 to the port 78 and to couple the DC port of the DC-AC converter 52 to the DC port 42 of the port 40 in a first operating mode. In this manner, a discharge of the battery storage 68 into a supply grid or a home grid is allowed. Accordingly, the port 78 of the supplementary charging device 74 can be coupled to the port 80 of a standard wallbox 82 without further adaptation. In other words, a negative current can thus flow from the storage 68 through the supplementary charging device 74, further through the wallbox 82 to the port 86 of an AC voltage supply in discharging the storage 68.

For charging the battery storage with AC power, the switch 38 is closed and an AC power fed into the port 86 is provided at the AC port 44 of the port 42. DC power incoming via the port 88 can be provided at the port 42 of the port 40 in a third operating mode and/or at the port 90 for charging a home battery storage in a fourth operating mode. In a fifth operating mode, the port 88 can be coupled to the DC port of the DC-AC converter 52, wherein the AC port of the DC-AC converter is coupled to the port 78 to feed DC power from a photovoltaic system as AC power into a home grid or supply grid. In a sixth operating mode, the port 88 is coupled to the DC port of the DC-AC converter 52, wherein the AC port of the DC-AC port 52 is coupled to the AC port 44 to store DC power of a photovoltaic system as AC power in the battery storage 68 via the on-board charger 64. In a seventh operating mode, the AC port of the DC-AC converter 52 is coupled to the port 78 and the DC port of the DC-AC converter 52 is coupled to the DC port 42 of the port 40 such that AC power coupled-in via the second port can be provided at the DC port 42 of the port 40 as DC power.

For realizing an AC-DC wallbox 94 according to an example of the invention, the housing 92 can be formed as large, see the housing 92', as components of a conventional AC wallbox 82 can be accommodated therein besides the supplementary charging device 74. Correspondingly, the ports 88 and 90 are provided at the housing 92' as ports 88' and 90'. The port 40 is formed as the port of the housing 92' just as the port 86.

Figure 6:
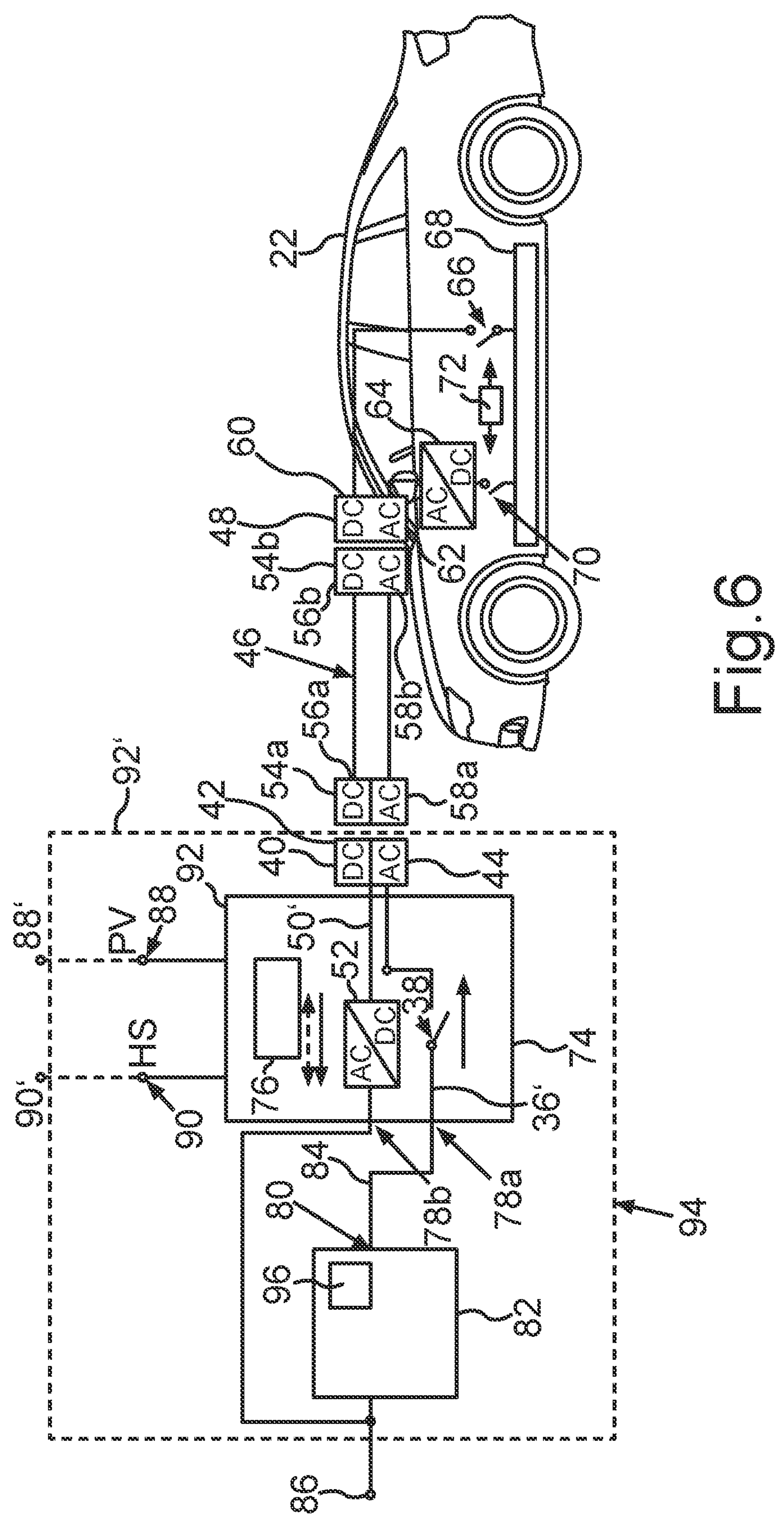
FIG. 6 is a schematic representation of a further example of a supplementary charging device according to the invention as well as an example of a further AC-DC wallbox according to the invention.

According to an alternative embodiment illustrated in FIG. 6, the port 78*b* of the supplementary charging device 74 can be coupled to the port 86 of the AC-DC wallbox 94 bypassing the AC wallbox 82, wherein the port 80 of the AC wallbox 82 is coupled to a port 78*a* of the supplementary charging device 74. The port 78*a* of the supplementary charging device 74 is coupled to the switch 38. In this manner, a current flows from the port 86, through the AC wallbox 82 to the port 80, from there via the AC cable 84 to the port 78*a* and from there, as described in context of FIG. 3, into the battery storage 68 in charging the battery storage 68. In discharging, a current flows from the battery storage 68, as also described, to the port 42 of the port 40 of the supplementary charging device 74, from there to the DC port of the DC-AC converter 52 and from the AC port of the AC-DC converter 52 to the port 78*b* of the supplementary charging device 74. Finally, the current flows from the port 78*b* to the port 86 bypassing the AC wallbox 82. This variant is to be used if the AC wallbox 82 does not tolerate a negative current.

An example of the present invention can account for a further problem: In bidirectionally operating DC wallboxes known from the related art, a motor vehicle cannot be incited by the DC wallbox to feed energy from the battery storage of the motor vehicle back into a home grid in default of energy supply in case of a power failure. Namely, the DC wallbox hereto would need an energy supply for communication with the motor vehicle, in particular the control device thereof, which controls the discharge of the battery storage. Accordingly, a so-called black start capability is basically not present in such a case. In the related art, to nevertheless provide it, batteries or accumulators are often installed in the DC wallbox. However, they are maintenance-intensive since they have to be exchanged upon ageing. Moreover, the batteries or accumulators occupy space, which results in an undesired increase of the installation space.

For solving this problem, in an embodiment of a supplementary charging device 74 according to the invention, it can be provided to supply it with energy from the AC port 62 of the vehicle 22 via its AC contact 44 as well as the AC-DC charging cable 46. For this purpose, the provision of AC energy to the supplementary charging device 74 can be initiated in the vehicle 22, for example by a switch or button in the charging port 48 or an operating option from the vehicle interior, for example by displaying a corresponding option "emergency power on" for selecting by a user on a display device of the vehicle 22. Upon activation of the option for providing AC energy, the switch 70 is first closed by the control device 72. Thereupon, the AC contact 44 can be supplied with AC energy in the above mentioned manner. Thereby, the charge supplementation device "awakes" and in turn closes the switch 38. The supplementary charging device 74 can then in turn stimulate the AC wallbox 82 to thus sequentially establish the DC path 50' for feeding energy back from the battery storage 68 of the motor vehicle 22 to the port 86 for coupling to a home grid. In particular, energy from the AC path 36' is used to generate the voltages and signals, which the vehicle 22, in particular the control device 72 thereof, expects according to the above mentioned charging standards, to close the switch 66 and thus to allow feeding DC energy from the battery storage 68 back into a home grid. Thus, energy from the motor vehicle 22 can be used here to provide the back-feeding capability.

In a further embodiment, the supplementary charging device 74 can include a 230 V wall socket, which is coupled to the AC port of the AC/DC converter 52 to supply at least one low-power appliance with energy from the vehicle storage 68 via the DC path 50' in case of a power failure.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide* v. *DIRECTV*, 358 F3d 870, 69 USPQ2d 1865 (Fed. Cir. 2004).

What is claimed is:

1. A supplementary charging device for an AC wallbox, comprising:

a housing;

a first port for coupling to a charging port of a vehicle, the first port including an AC port and a DC port;

a second port for coupling to an AC output of the AC wallbox via an AC charging cable;

an at least unidirectionally formed DC/AC converter; and a control device arranged in the housing, the control device to couple the second port to the AC port of the first port, to couple the AC port of the at least unidirectionally formed DC/AC converter to the second port and to couple the DC port of the at least unidirectionally formed DC/AC converter to the DC port of the first port in a first operating mode, such that power coupled-in via the DC port of the DC/AC converter is provided at the second port.

2. The supplementary charging device according to claim 1, wherein the control device to provide power coupled-in at the second port at the AC port of the first port in a second operating mode.

3. The supplementary charging device according to claim 2, wherein the supplementary charging device to charge a storage device coupled to the AC port of the first port, in the second operating mode, to a first rated power ($P_{nom1}$), wherein the supplementary charging device is further configured to discharge a storage device coupled to the DC port of the first port, in the first operating mode, to a second rated power ($P_{nom2}$), wherein the first rated power ($P_{nom1}$) is greater than the second rated power ($P_{nom2}$), wherein the first rated power ($P_{nom1}$) is between 11 and 22 kW and the second rated power ($P_{nom2}$) is between 200 W and 5 kW.

4. The supplementary charging device according to claim 1, wherein the first port to be coupled to the charging plug of an AC-DC charging cable in a single plug-in operation, or that the supplementary charging device includes an AC-DC charging cable, wherein the AC-DC charging cable comprises a port as the first port, to be coupled to a charging port of a vehicle in a single plug-in operation.

5. The supplementary charging device according to claim 2, wherein the first port to be coupled to the charging plug of an AC-DC charging cable in a single plug-in operation, or that the supplementary charging device includes an AC-DC charging cable, wherein the AC-DC charging cable comprises a port as the first port, to be coupled to a charging port of a vehicle in a single plug-in operation.

6. The supplementary charging device according to claim 3, wherein the first port to be coupled to the charging plug of an AC-DC charging cable in a single plug-in operation, or that the supplementary charging device includes an AC-DC charging cable, wherein the AC-DC charging cable comprises a port as the first port, to be coupled to a charging port of a vehicle in a single plug-in operation.

7. The supplementary charging device according to claim 1, wherein the DC/AC converter is unidirectionally operable or bidirectionally operable.

8. The supplementary charging device according to claim 2, wherein the DC/AC converter is unidirectionally operable or bidirectionally operable.

9. The supplementary charging device according to claim 3, wherein the DC/AC converter is unidirectionally operable or bidirectionally operable.

10. The supplementary charging device according to claim 1, wherein the supplementary charging device further comprises a third port, which is a DC port, wherein the control device:

to provide DC power incoming via the third port at the DC port of the first port in a third operating mode and/or at a fourth port of the supplementary charging device as DC power in a fourth operating mode, wherein the fourth port to couple to a home battery storage, and/or to couple the third port to the DC port of the DC/AC converter in a fifth operating mode, wherein the AC port of the DC/AC converter is coupled to a fifth port of the supplementary charging device, which can be coupled to a feed-in point of a home grid, and/or to couple the third port to the DC port of the DC/AC converter in a sixth operating mode, wherein the AC port of the DC/AC converter is coupled to the AC port of the first port.

11. The supplementary charging device according to claim 2, wherein the supplementary charging device further comprises a third port, which is a DC port, wherein the control device:

to provide DC power incoming via the third port at the DC port of the first port in a third operating mode and/or at a fourth port of the supplementary charging device as DC power in a fourth operating mode, wherein the fourth port to couple to a home battery storage, and/or to couple the third port to the DC port of the DC/AC converter in a fifth operating mode, wherein the AC port of the DC/AC converter is coupled to a fifth port of the supplementary charging device, which can be coupled to a feed-in point of a home grid, and/or to couple the third port to the DC port of the DC/AC converter in a sixth operating mode, wherein the AC port of the DC/AC converter is coupled to the AC port of the first port.

12. The supplementary charging device according to claim 3, wherein the supplementary charging device further comprises a third port, which is a DC port, wherein the control device:

to provide DC power incoming via the third port at the DC port of the first port in a third operating mode and/or at a fourth port of the supplementary charging device as DC power in a fourth operating mode, wherein the fourth port to couple to a home battery storage, and/or to couple the third port to the DC port of the DC/AC converter in a fifth operating mode, wherein the AC port of the DC/AC converter is coupled to a fifth port of the supplementary charging device, which can be coupled to a feed-in point of a home grid, and/or to couple the third port to the DC port of the DC/AC converter in a sixth operating mode, wherein the AC port of the DC/AC converter is coupled to the AC port of the first port.

13. The supplementary charging device according to claim 1, wherein the control device to couple the AC port of the DC/AC converter to the second port and to couple the DC port thereof to the DC port of the first port in a seventh operating mode, such that power coupled-in via the second port can be provided at the DC port of the first port.

14. The supplementary charging device according to claim 2, wherein the control device to couple the AC port of the DC/AC converter to the second port and to couple the DC port thereof to the DC port of the first port in a seventh operating mode, such that power coupled-in via the second port can be provided at the DC port of the first port.

15. The supplementary charging device according to claim 1, wherein an average electrical basic consumption of a home is ascertained, to the home connection of which the supplementary charging device is coupled in discharging, wherein the second rated power is set depending on this average basic consumption.

16. The supplementary charging device according to claim 2, wherein an average electrical basic consumption of a home is ascertained, to the home connection of which the supplementary charging device is coupled in discharging, wherein the second rated power is set depending on this average basic consumption.

17. An AC-DC wallbox comprising:

a housing; and a supplementary charging device comprising:

a first port for coupling to a charging port of a vehicle, the first port including an AC port and a DC port, a second port for coupling to an AC output of the AC wallbox via an AC charging cable, an at least unidirectionally formed DC/AC converter, and a control device arranged in the housing, the control device to couple the second port to the AC port of the first port, to couple the AC port of the at least unidirectionally formed DC/AC converter to the second port and to couple the DC port of the at least unidirectionally formed DC/AC converter to the DC port of the first port in a first operating mode, such that power coupled-in via the DC port of the DC/AC converter is provided at the second port;

a port for coupling to a home grid or electrical grid; and a control and protection device, which is coupled to the port for coupling to a home grid or electrical grid on the input side and which is coupled to the second port of the supplementary charging device on the output side, wherein at least the first port of the supplementary charging device is a port of the AC-DC wallbox.

18. The AC-DC wallbox according to claim 17, wherein the control device to couple the AC port of the DC/AC converter to the port for coupling to a home grid or electrical grid of the AC-DC wallbox in a fifth operating mode.

19. The AC-DC wallbox according to claim 17, wherein a third and/or a fourth and/or a fifth port of the supplementary charging device are corresponding ports of the AC-DC wallbox.

20. The AC-DC wallbox according to claim 18, wherein a third and/or a fourth and/or a fifth port of the supplementary charging device are corresponding ports of the AC-DC wallbox.

* * * * *